United States Patent [19]
Bourgault

[11] Patent Number: 6,024,179
[45] Date of Patent: Feb. 15, 2000

[54] COULTER WITH AN INSIDE FLOATING SCRAPER AND AN OUTSIDE SPRING CLOSER TINE

[75] Inventor: Gerard F. Bourgault, St. Brieux, Canada

[73] Assignee: Bourgault Industries Ltd., St. Brieux, Canada

[21] Appl. No.: 09/031,689

[22] Filed: Feb. 27, 1998

[51] Int. Cl.[7] .................................................. A01B 15/16
[52] U.S. Cl. .......................................... 172/566; 172/558
[58] Field of Search ................................. 172/49, 96, 556, 172/558, 559, 560, 561, 562, 563, 564, 566, 572; 111/52, 139, 140, 191, 130

[56] References Cited

U.S. PATENT DOCUMENTS

| | | |
|---|---|---|
| 493,182 | 3/1893 | Platt . |
| 1,120,875 | 12/1914 | Wittler . |
| 1,545,895 | 7/1925 | Hamilton . |
| 2,442,727 | 6/1948 | Hyland . |
| 2,489,385 | 11/1949 | Paul . |
| 2,617,344 | 11/1952 | Carney ................................ 172/558 X |
| 4,502,547 | 3/1985 | MacIntyre ............................... 172/606 |
| 4,628,840 | 12/1986 | Jacobson ............................ 172/558 X |
| 5,626,196 | 5/1997 | Hughes .................................. 172/558 |

*Primary Examiner*—Robert E. Pezzuto
*Attorney, Agent, or Firm*—Hollander Law Firm, P.L.C.

[57] ABSTRACT

A coulter is provided to create furrows in a field, while at the same time reducing the amount of soil and debris which accumulates on the coulter disc. The coulter has a disc for creating furrows, with a floating scraper blade on the inner side to keep the inner side of the disc free of debris. The scraper blade also assists in maintaining the furrow once it has been opened by the disc. A tine extends across the outer side of the disc in a configuration that prevent soil from adhering to the outer side of the disc, and in trash covered fields, trash will wrap around the tine to act as an organic wear pad between the disc and the tine.

16 Claims, 8 Drawing Sheets

COULTER WITH AN INSIDE FLOATING SCRAPER AND AN OUTSIDE SPRING CLOSER TINE

FIELD OF THE INVENTION

The present invention relates to agricultural implements and is particularly concerned with a coulter with an inside floating scraper and an outside spring closer tine.

BACKGROUND OF THE INVENTION

Farmers frequently plant crops in fields that have debris and waste material covering the field. Such material may consist of straw or old crops, which is frequently referred to as trash. In order to plant seeds or deposit fertilizer in such fields, coulters are tools that are used to create furrows or seed trenches in the soil. Circular discs are frequently used to perform this operation. These discs are typically attached, in a side-by-side configuration, to a frame which is then pulled behind a tractor to till a field.

One problem that may occur with known coulter discs is an accumulation of dirt and debris between the discs and the struts as they rotate through the soil. If the soil is wet, it may stick to the discs in the form of clumps, which can inhibit rotation of the discs, cause poor disc penetration, excessive soil disturbance and create excessive draft forces.

In U.S. Pat. No. 493,182 issued Mar. 7, 1893, Platt teaches the use of a rod, which rotates freely about a spool between discs, to break up clogs of dirt and debris which form as the coulter discs create a furrow. The rod drags behind the discs and as soil accumulates, the rod rotates upward until the rod is stopped above the discs. The rod breaks the soil clumps which fall beside the disc. A scraper blade is also provided which is subject to a spring force to keep the scraper blade in contact with a surface of the coulter. As the coulter disc rotates, the scraper blade maintains contact with the surface to remove debris.

In U.S. Pat. No. 5,626,196 issued May 6, 1997, Hughes teaches the use of a blade which continuously contacts the surfaces of a coulter disc to scrape the disc and clean it as the disc rotates. In an embodiment, the scraper blade is made of plastic to permit flexibility, as it also bends when in contact with the soil. This scraper blade performs the dual role of acting as a scraper/cleaner and also as a closer. Once the disc opens a furrow in the soil, the scraper blade acts as a closer since it will force some of the soil back into the furrow after seeds have been deposited.

SUMMARY OF THE INVENTION

It is an object of the present invention to provide an improved coulter, particularly one which utilizes a disc to create furrows with a tine on the outside of the disc to act as a cleaner and to promote the formation of an organic wear pad, and a scraper blade on the inside of the disc to clean the disc as it rotates.

In accordance with one aspect of the present invention, there is provided a coulter assembly adapted to be mounted on a frame of a farm implement including: a mounting bracket; a strut; means for pivotally connecting said strut to said mounting bracket; a two-sided disc, said disc being rotatably attached to said strut; and a tine, attached to said strut and extending across at least one side of the disc, the tine adapted in operation to collect trash and form an organic wear pad and thereby remove soil build-up and avoid excess wear on the disc and tine.

In accordance with another aspect of the present invention, there is provided a coulter assembly comprising: a substantially vertically oriented mounting bracket having a lower end and an upper end; a strut, having an upper end and a lower end; a coupling attached to the upper end of the strut and pivotally connected to the lower end of the mounting bracket; a disc, rotatably attached to the lower end of the strut whereby an inner side of the disc faces the strut; a tine, attached to the strut and extending across an outer side of the disc, wherein the tine is an elongate member with a first end attached to the coupling, said elongate member being bent in such a configuration as to extend across the outer surface of the disc such that only a second end of the elongate member contacts the disc; the second end remaining inside the perimeter of the disc; said tine being adapted in operation to collect trash and thereby form an organic wear pad to avoid excess wear on the disc and tine and clean said disc; and a spring connected between the mounting bracket and the coupling whereby the coupling will rotate upon elevation of the tine to avoid obstacles when in operation.

Advantages of the present invention include: the coulter may be used to create furrows and deposit seeds or fertilizer in trash covered fields, and use of a tine, which results in the formation of an organic wear pad between the tine and the disc, preventing soil build-up on the disc surface without requiring the disc be cleaned to its surface.

BRIEF DESCRIPTION OF THE DRAWINGS

The present invention will be further understood from the following description with references to the drawings in which.

DETAILED DESCRIPTION OF THE PREFERRED EMBODIMENT

Figure 1:
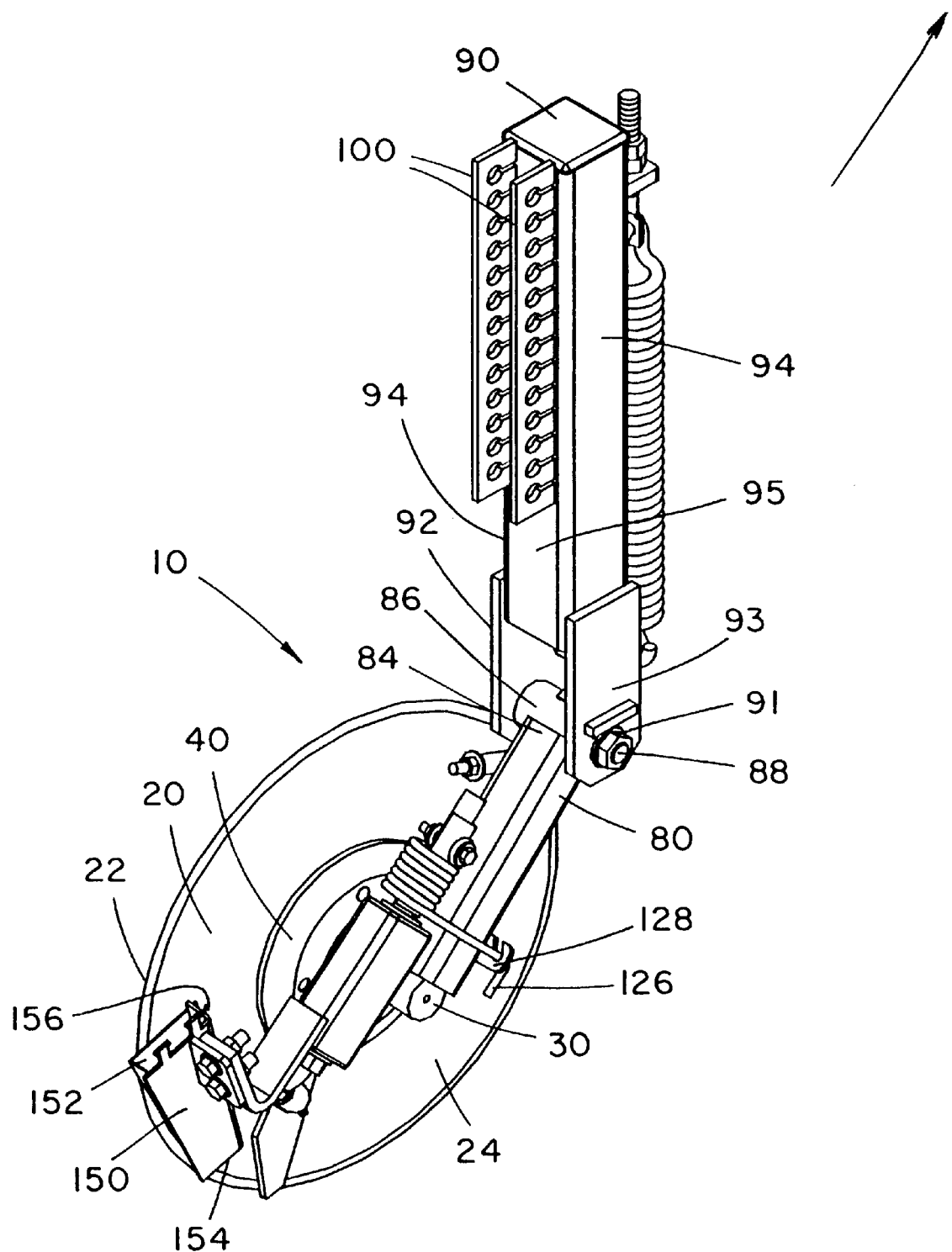
FIG. 1 is a perspective view of a coulter according to an embodiment of the invention.

Certain terminology is used in this description for convenience and reference and is not intended to be limiting. For example, the words "forward", "rear", "up", "down" and derivatives thereof will refer to directions in the drawings to which reference is made. In FIGS. 1 to 8, the direction indicated by the arrow in FIG. 1 will be referred to as "forward".

Referring firstly to FIG. 1, a coulter according to an embodiment of the invention is generally indicated by 10.

Disc 20 is substantially circular with an outer perimeter 22 that is bevelled to a sharp edge to permit disc 20 to easily enter soil to create a furrow or a seed or fertilizer trench during tilling operations. Disc 20 is preferably made of steel and is approximately 50 cm. in diameter. There is a bore (not shown) in the center of disc 20 to permit the mounting of disc 20 on hub 40. Disc 20 has two sides which will be referred to as an inner side 24, seen in FIGS. 1 and 2, and an outer side 26, seen in FIGS. 3 and 4.

Figure 6:
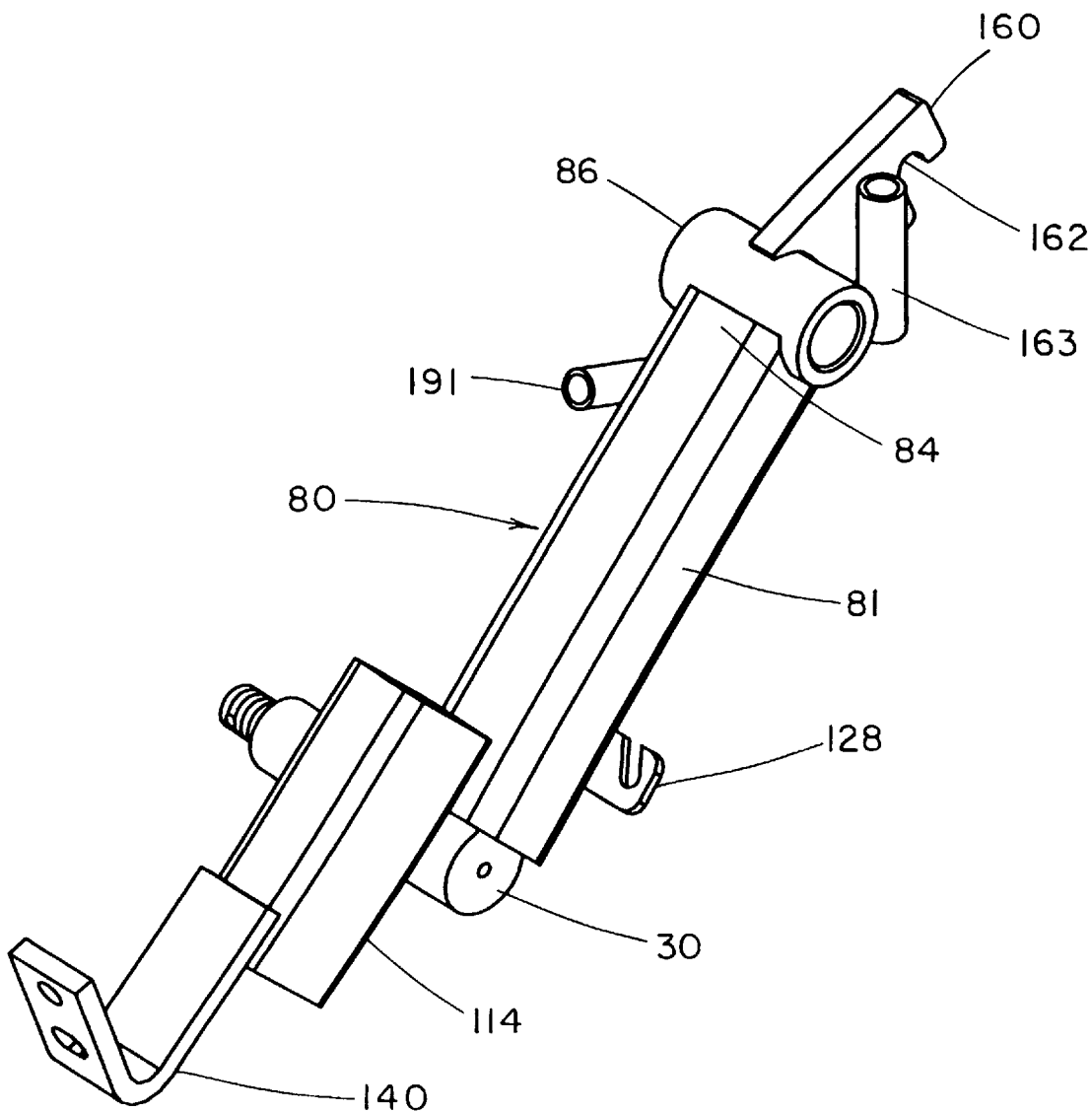
FIG. 6 is an enlarged perspective view of the strut, spindle, housing and bracket of the coulter of FIG. 1.
Figure 7:
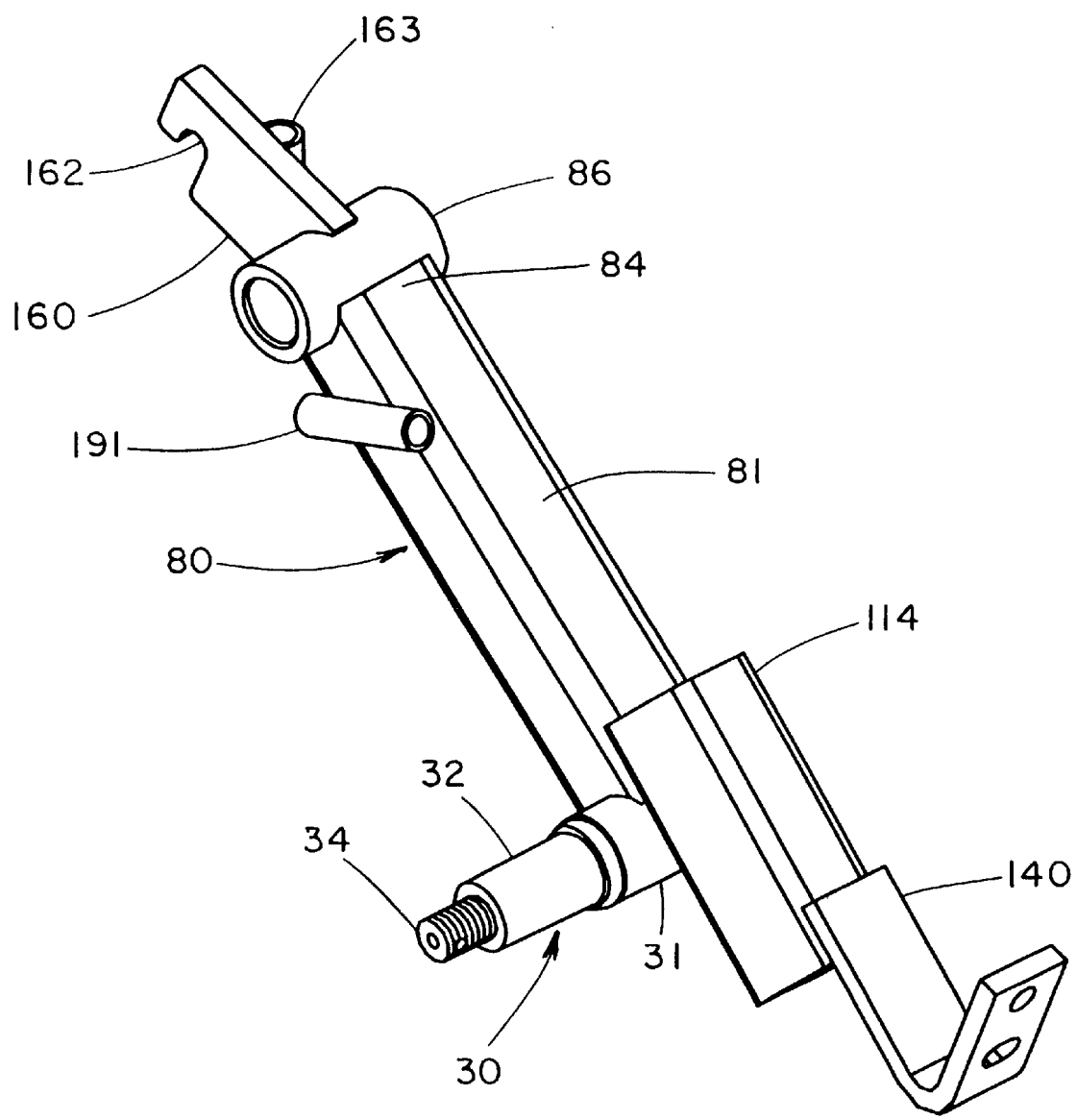
FIG. 7 is an enlarged perspective view of the strut, spindle, housing and bracket of the coulter of FIG. 1.

Spindle 30 is a member that acts as an axle to support hub 40. As shown in FIGS. 6 and 7, spindle 30 comprises section 31, 32 and 34. Sections 31 and 32 are solid, co-axial rod-shaped sections and section 32 has a smaller diameter than section 31. Section 34 is a threaded pin extending from section 32 and is co-axial with section 32.

Figure 5:
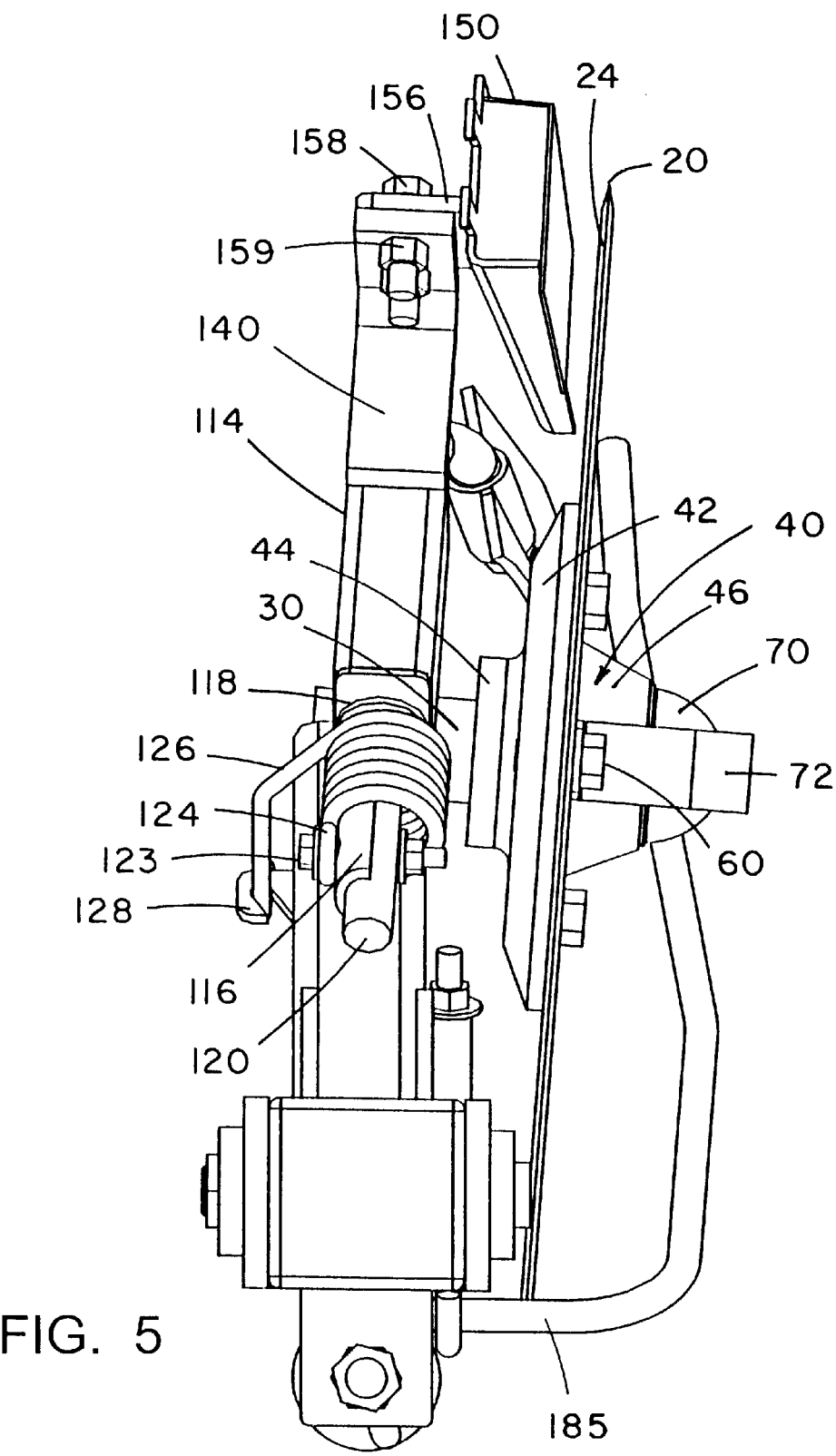
FIG. 5 is a top view of the coulter of FIG. 1.

Hub 40 is a one-piece member, shown in the top view of the coulter in FIG. 5, having a conical shaped section 42, a tubular section 44, and a shoulder 46. Hub 40 has a bore (not shown) through its center, and hub 40 slides over spindle 30 resulting in hub 40 acting as an axle for disc 20.

Figure 2:
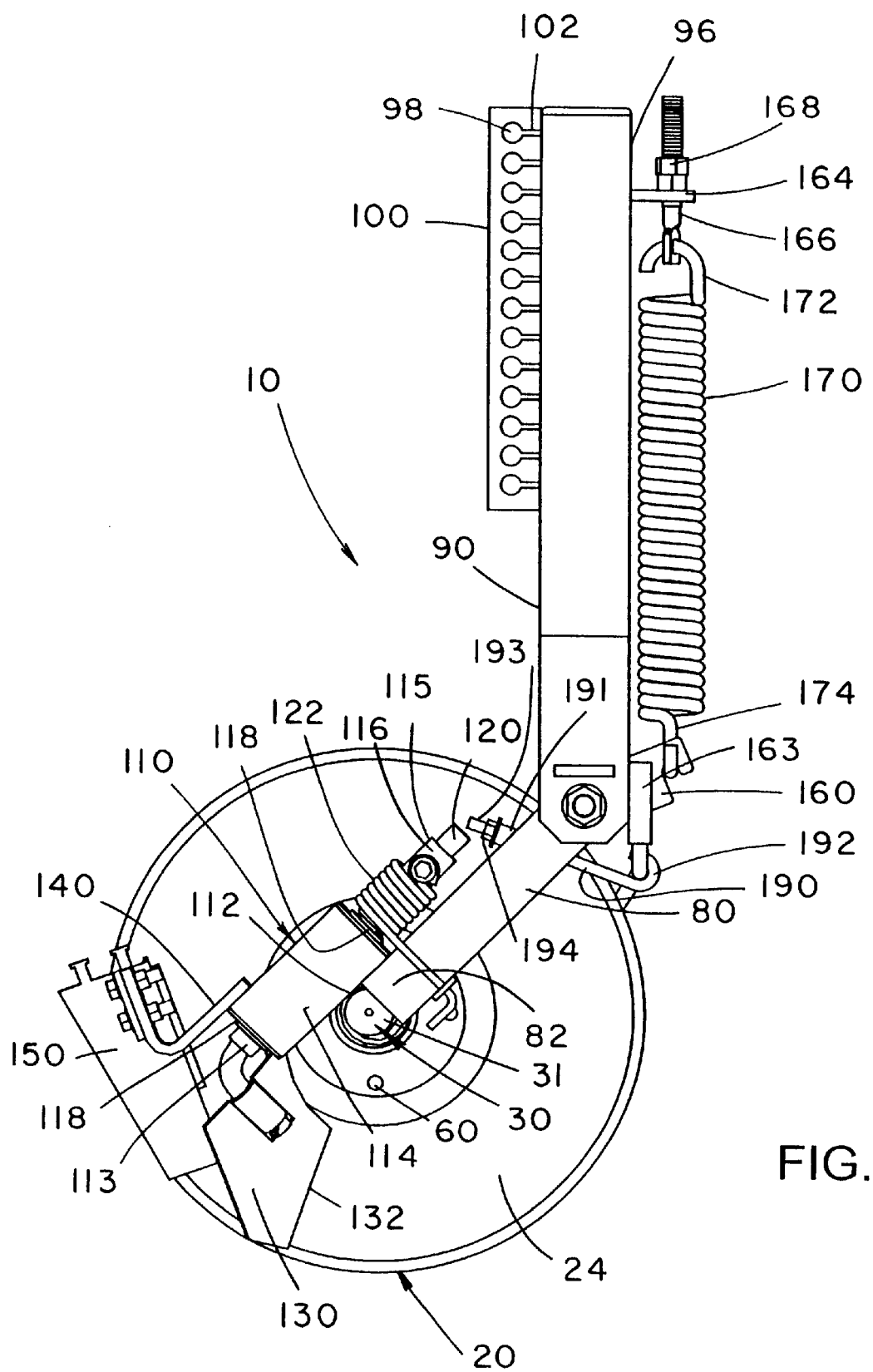
FIG. 2 is a side view of the coulter of FIG. 1.
Figure 4:
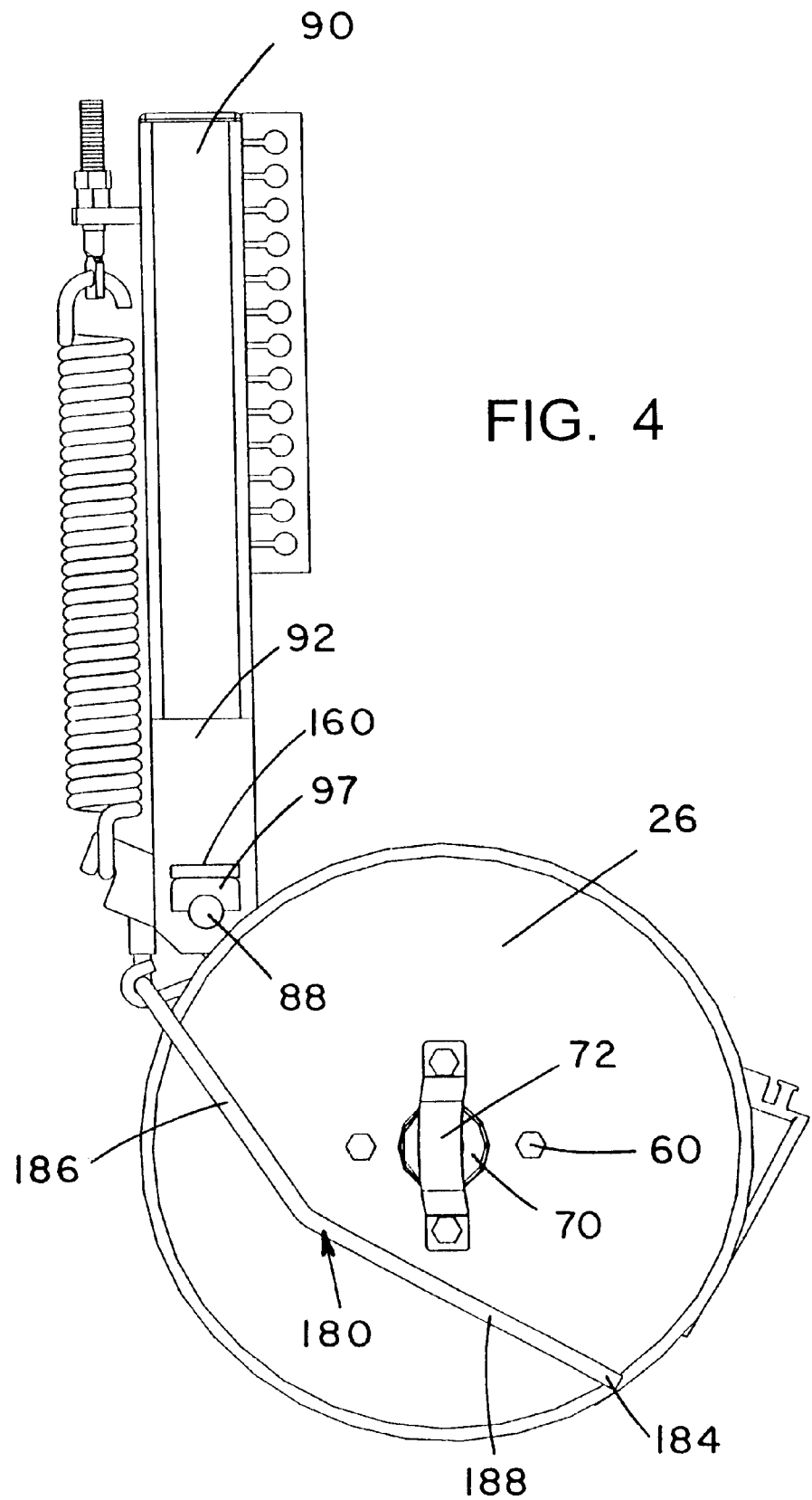
FIG. 4 is a side view of the coulter of FIG. 1.

As shown in FIG. 5, disc 20 slides over the shoulder 46 of hub 40 until the inner side 24 of disc 20 abuts against conical shaped section 42 of hub 40. Disc 20 is secured to hub 40 with bolts 60. As shown in FIGS. 4 and 5, four bolts 60 pass through holes (not shown) in disc 20, and bolts 60 are threaded into holes in hub 40 that are adapted to receive bolts 60, as shown in FIG. 2. As a result of this configuration, disc 20 is secured on hub 40, and disc 20 is free to rotate about spindle 30 via hub 40.

Figure 3:
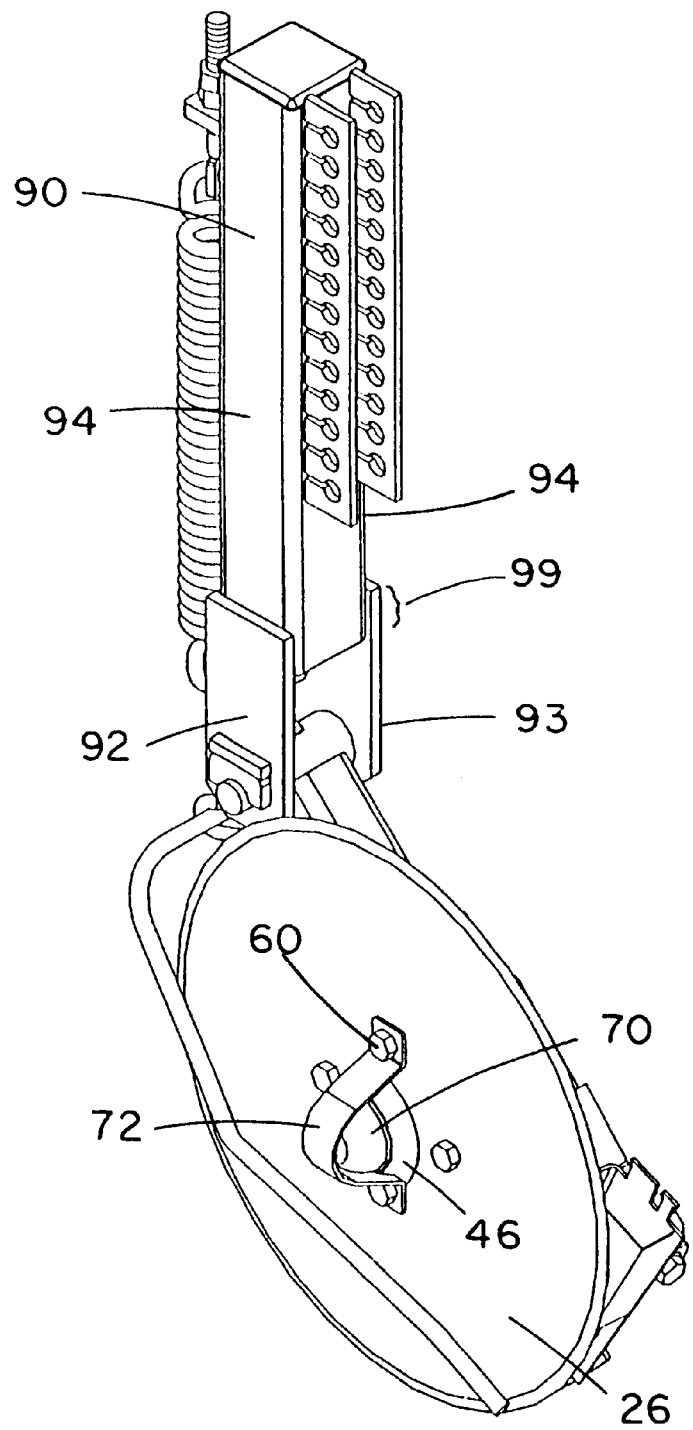
FIG. 3 is a perspective view of the coulter of FIG. 1.

As shown in FIGS. 3 and 5, a dust cap 70 is attached to spindle 30 against shoulder 46 to prevent dust and debris from interfering with rotation of disc 20. As shown in FIGS. 3 and 4, a dust cap shield 72 is attached to the outer side 26 of disc 20 to provide further protection to the dust cap 70 and spindle 30. In the illustrated embodiment, dust cap 70 is semi-spherical. As shown in FIGS. 3 and 4, dust cap shield 72 is a rectangular steel plate with two ends attached to the outer side 26 of disc 20. Two of the bolts 60 pass through the ends of dust cap shield 72 to secure dust cap shield 72 to the outer side 26 of disc 20. The remaining plate is bent in a configuration which adapts to the exterior of shoulder 46 and along the semi-spherical shape of dust cap 70.

Referring to FIG. 2, spindle 30 extends beyond the hub 40 on the inner side 24 of disc 20 and is attached to strut 80, preferably by a weld between section 31 of spindle 30 and strut 80. Strut 80 is located opposite the inner side 24 of disc 20, and as shown in FIG. 2, strut 80 is welded at a first end 82 to the circular surface of section 31 of spindle 30. As shown in FIG. 1, strut 80 extends upward and forward from spindle 30 such that a second end 84 of strut 80 is located outside the outer perimeter 22 of disc 20.

As shown in FIGS. 6 and 7, strut 80 is a preferably a one-piece steel hollow member 81 with a rectangular cross-section. Attached at the second end 84 of strut 80 is a coupling 86, which is a tubular shaped member. As shown in FIG. 1, coupling 86 rotates about pin 88, which is fixed at either end to plates 92 and 93. In FIG. 1, pin 88 is shown to be secured to plate 93 with a nut 91. As shown in FIG. 4, pin 88 is welded to a plate 97, which is located directly above pin 88 on plate 92. Plate 97 is shown as a rectangular plate with a notch adapted to receive pin 88. Directly above plate 97 is a substantially rectangular stub 160, which is welded to plate 92 and plate 97. As a result of this configuration, pin 88 is restrained from rotation when mounted between plates 92 and 93. Plates 92 and 93 are rectangular plates which extend substantially vertically from the location where they are fixed to the ends of pin 88 until they reach mounting bracket 90.

Figure 8:
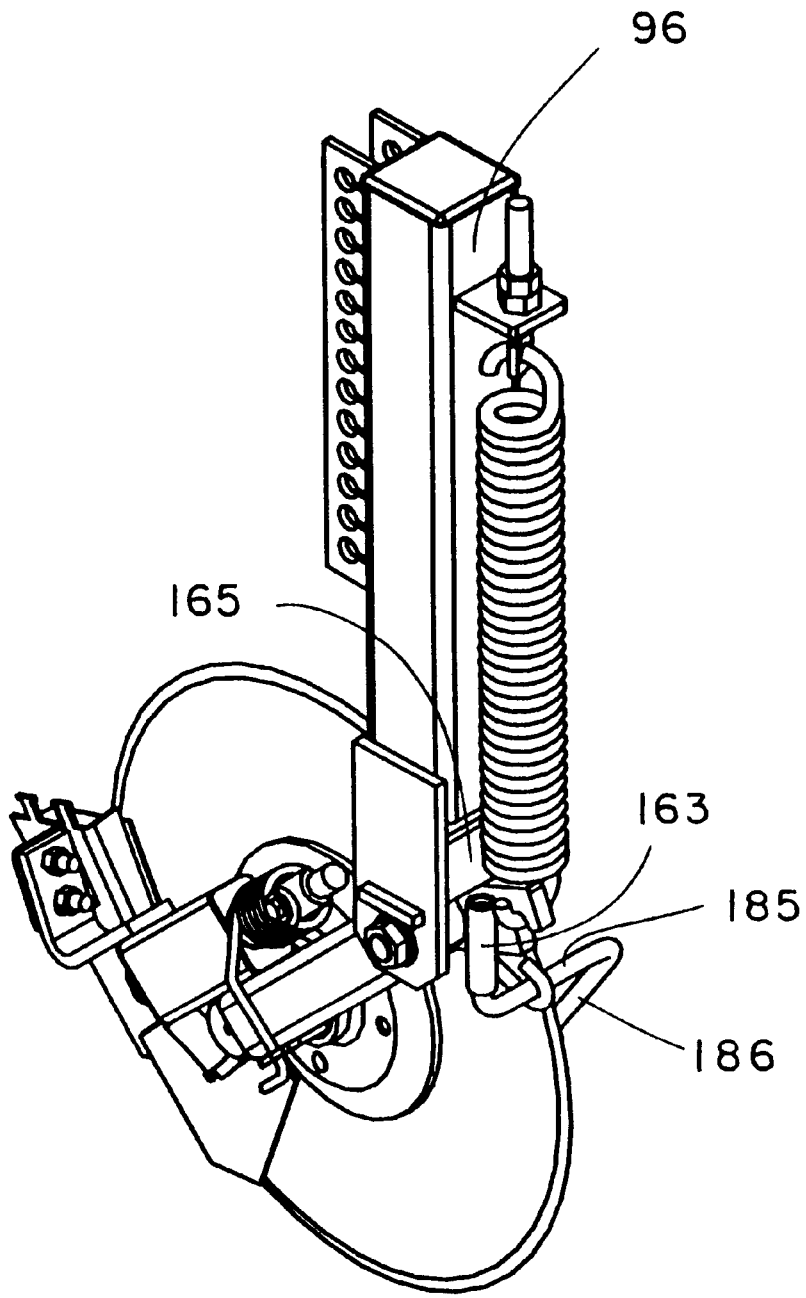
FIG. 8 is a perspective view of the coulter of FIG. 1.

As shown in FIG. 1, mounting bracket 90 extends substantially vertically from plates 92 and 93, and is used to attach coulter 10 to an agricultural instrument, such as a horizontal beam (not shown) pulled behind a tractor. Accordingly, a number of coulters 10 may be arranged in a side-by-side configuration along the beam. As shown in FIG. 1, mounting bracket 90 is preferably a member with a square cross-section, defined by two sides 94, a rear section 95 and a front section 96, which is shown in FIG. 8. As shown in FIG. 3, a portion of plates 92 and 93 overlap a portion of sides 94 of mounting bracket 90, and preferably, welds are employed in the overlap region 99 to attach plates 92 and 93 to sides 94 of mounting bracket 90. As shown in FIG. 1, two adjustment plates 100 are attached to the front section 96 of mounting bracket 90 for a length of approximately 35 cm measured from the top of mounting bracket 90. Adjustment plates 100 have two opposing long edges, one of which is indicated as 102 in FIG. 2, and adjustment plates 100 are attached to mounting bracket 90 with a weld between one of the long edges 102 and rear section 95. The plates 100 are spaced apart from each other and attached to rear section 95 so that adjustment plates 100 are substantially parallel to sides 94 of mounting bracket 90.

As shown in FIG. 2, each adjustment plate 100 contains a number of apertures 98, positioned along the length of plates 100. Apertures 98 are used to connect mounting bracket 90 to a beam. The number of apertures 98 permits a setting that allows various depths of soil trenches to be created with disc 20. In the embodiment, apertures 98 are shown as key-shaped, but it is understood that a hole or other aperture may perform the same function.

As shown in FIG. 2, a scraper torque arm 110 is attached to strut 80 and to section 31 of spindle 30, which extends past the inner side 24 of disc 20. Scraper torque arm 110 comprises a housing 114, which is shown in the embodiment to be a box-shaped section, rectangular in cross-section, and extends from a point below and rearward of spindle 30 to a position forward and above spindle 30. Preferably, scraper torque arm 110 is attached to strut 80 and spindle 30 by welding housing 114 to both spindle 30 and strut 80 at the location identified as 112.

Housing 114 encloses a spacer 116, which is semicircular in shape and lies under spring 122 and properly positions spring 122 on shaft 120. Spacer 116 includes at least one hole to secure it in position with bolt 123. Bolt 123 secures both spring 122 and spacer 116. Washers 118 are attached at either end of housing 114. A shaft 120 is inserted through the center of spacer 116 and co-axial with the spacer. Shaft 120 extends beyond the forward end 115 and rearward end 113 of spacer 116.

As shown in FIG. 5, a bolt 123 attaches torsion spring 122, or other resilient means, to shaft 120 and spacer 116 by pressing one end 124 of torsion spring 122 against the exterior surface of spacer 116. There is a hole (not shown) extending transversely through shaft 120, which aligns with a hole (not shown) in the spacer 116 to receive bolt 123 at the forward end 115 of spacer 116. Torsion spring 122 is shown in FIG. 2 as a helical spring enclosing spacer 116 and shaft 120, extends downward and rearward toward housing 114. The second end 126 of torsion spring 122 is attached to strut 80, as shown in FIG. 1, via a hooked member 128 which is attached, preferably by welds, to strut 80.

As shown in FIG. 2, at the lower end of housing 114, shaft 120 bends at right angles away from the long axis of housing 114, and at the same tine extends toward the inner side 24 of disc 20. The lower end of shaft 120 is welded to a scraper blade 130. Scraper blade 130 has an edge 132 in contact with the inner side 24 of disc 20. The configuration of the torsion spring 122, spacer 116, shaft 120, and housing 114 results in torque being exerted on scraper blade 130 such that scraper blade 130 maintains contact with inner side 24 of disc 20.

As shown in FIGS. 2, 6 and 7, a bracket 140 is attached to the top of the housing 114, preferably with a weld. As shown in FIG. 1, bracket 140, shown in the embodiment as L-shaped, joins housing 114 to tube holder 150. Tube holder 150 is located on the inner side of disc 20 in a position to deposit seeds or fertilizer in the trench created by disc 20. Preferably, tube holder 150 is a trapezoidal shaped container with an open top 152 and bottom 154. Seeds or fertilizer will feed into the top 152 of tube holder 150 from a hopper and tube system (not shown) and exit tube holder 150 at the bottom 154 where they will fall into a furrow created by disc 20. As shown in FIGS. 1 and 5, tube holder 150 has a flange 156 extending transversely from tube holder 150. As shown in FIG. 5, flange 156 is attached to bracket 140, preferably with bolts 158 and nuts 159.

As shown in FIGS. 2, 6 and 7, a flange 160 is attached to coupling 86, preferably with a weld, and flange 160 extends forward and upward from coupling 86. Flange 160 contains a hook shaped feature 162 (see FIGS. 6 and 7). As shown in FIG. 2, near the top of mounting bracket 90, a flange 164 is attached to front section 96 of mounting bracket 90, preferably with a weld. Flange 164 extends horizontally, and contains an aperture (not shown). An eyebolt 166 is inserted through the aperture in flange 164 and secured with nuts 168. As shown in FIG. 2, a spring 170 with an upper end 172 and lower end 174 is positioned between flanges 160 and 164. Upper section 172 is inserted through the aperture in eyebolt 166, and lower section 174 is secured in the hook shaped feature 162 in flange 160. Accordingly, spring 170 is substantially vertical. As shown in FIG. 8, a flange 165 is attached, preferably with welds, between plates 92 and 93 at a position above flange 160, such that flange 165 stops flange 160 from moving upward. Accordingly, spring 170 is in tension, pulling upward on flange 160, but flange 165 acts as a "stop" to define the position shown in FIG. 2. If flange 160 moves downward due to clockwise rotation of coupling 86, spring 170 exerts greater tension between flanges 160 and 164, thereby urging flange 160 back to a position against flange 165.

As shown in FIGS. 2 and 6, a cylindrical shaped bushing 163 is attached, in a substantially vertical direction, to the outer side of flange 160. As shown in FIG. 2, a tine 180 has a first end which is inserted inside bushing 163. Tine 180 then extends downward from coupling 86 while remaining outside the outer perimeter 22 of disc 20, then tine 180 bends at substantially a right angle so that tine 180 passes from the inside of disc 20, as shown in FIGS. 2 and 8, to the outside of disc 20, as shown in FIG. 4, resulting in a substantially horizontal section 185 as shown in FIGS. 5 and 8. Once tine 180 passes the outer side 26 of disc 20, it bends downward and rearward in a path that extends across the outer side 26 of disc 20, shown as sections 186 and 188 in FIG. 4. Section 186 of tine 180 is substantially equidistant from the outer side 26 of disc 20, then tine 180 extends downward, rearward, and toward the outer side 26 of disc 20 in section 188 such that the second end 184 of tine 180 terminates on outer side 26 of disc 20, but inside outer perimeter 22. The second end 184 of tine 180 touches the outer side 26 of disc 20. In the illustrated embodiment, tine 180 is shown to be a continuous elongate member with a circular cross section. While this embodiment is preferred, it is understood that a similar device may be used, for example, a bar with a square or hexagonal cross-section, while still achieving the advantages of the invention.

As shown in FIGS. 2 and 7, a cylindrical shaped bushing 191 is attached, preferably by a weld, to a face of strut 80 that is opposite the inner side 24 of disc 20. A tine mount rod 190, as shown in FIG. 2., is inserted into bushing 191. Tine mount rod 190 has a hooked end 192 and a straight end 193. Bushing 191 is oriented on strut 80 such that the hooked end 192 of tine mount rod 190 engages the substantially horizontal section 185 of tine 180 to support the tine. Straight end 193 extends through bushing 191 and a nut 194 fits over the end 193 to secure tine mount rod 190 to bushing 191.

In operation, the coulter 10 is pulled in the direction indicated by the arrow in FIG. 1 and disc 20 creates a furrow in the soil. Scraper blade 130 is in metal-to-metal contact with the inside 24 of disc 20, resulting from the torsion exerted by spring 122 on shaft 120. Accordingly, inner side 24 of disc 20 is kept clear of debris. Scraper blade 130 also acts to keep the furrow open while seeds or fertilizer are deposited. Tube holder 150 is attached to a tube (not shown), and seeds or fertilizer are dropped from a hopper (not shown) through the tube into tube holder 150. Fertilizer or seeds subsequently fall out the bottom 152 of tube holder 150 into the furrow.

If the coulter is used in wet or sticky soil, large sods or clumps of soil may be carried with the disc 20 as it rotates, but the sods will be broken on the outer side 26 by tine 180. Accordingly, tine 180 allows a tilling operation to continue by keeping the outer side 26 of disc 20 free of large clumps of soil. Outer side 26 of disc 20 is not necessarily kept clean down to its metal surface. If coulter 10 is used in a field which has not been cleared, straw and trash will wrap around tine 180, forming an organic wear pad between tine 180 and disc 20 to prevent wear on the outer side 26 of disc 20. If rocks or other obstructions are encountered in the field, tine 180 will be elevated. Since tine 180 is attached to coupling 86, if the remote end 184 of tine 180 is forced upwards, coupling 86 will rotate and flange 160 will move downward, placing spring 170 into tension and at the same tine permitting strut 80 to elevate since strut 80 and tine 180 are both attached to coupling 86. After the obstruction is passed, tine 180 and strut 80 will return to their original position since flange 160 will move upward until stopped by flange 165.

Numerous modifications, variations, and adaptations may be made to the particular embodiments of the invention described above without departing from the scope of the invention as defined in the claims.

I claim:

1. A coulter assembly adapted to be mounted on a frame of a farm implement including:
   (a) a mounting bracket;
   (b) a strut;
   (c) means for pivotally connecting said strut to said mounting bracket;
   (d) a two-sided disc, said disc being rotatably attached to said strut; and
   (e) a tine, attached to said strut and extending across at least one side of the disc, the tine adapted in operation to collect trash and form an organic wear pad and thereby remove soil build-up and avoid excess wear on the disc and tine.

2. The coulter assembly of claim 1 wherein two sides of said disc comprise an inner side and an outer side whereby the inner side of the disc faces the strut and the tine extends across the outer side of the disc.

3. The coulter assembly of claim 2 wherein the tine is an elongate member with a first end attached to said strut; said elongate member being bent in such a configuration as to extend across said outer side of the disc; and wherein a second end of said elongate member is in contact with said outer side of the disc; said second end remaining inside a perimeter of said disc at all times during operation.

4. The coulter assembly of claim 3 further comprising a tine mount rod attached to the strut to support the tine.

5. The coulter assembly of claim 4 further comprising means connected between the mounting bracket and the strut to permit movement of the tine to avoid obstacles when in operation.

6. The coulter assembly of claim 5 wherein the means connected between the mounting bracket and the strut to permit movement of the tine to avoid obstacles when in operation comprises:

(a) a coupling attached to the strut and the tine, the coupling pivotally connected to the mounting bracket; and (b) resilient means connected between the mounting bracket and the coupling whereby the coupling will rotate when the tine encounters obstacles in operation.

7. The coulter assembly of claim 6 wherein the resilient means is a spring.

8. The coulter assembly of claim 5 wherein the means connected between the mounting bracket and the strut to permit movement of the tine to avoid obstacles comprises resilient means connected between the mounting bracket and the strut whereby the strut will pivot when the tine encounters obstacles in operation.

9. The coulter assembly of claim 8 wherein the resilient means is a spring.

10. The coulter assembly of claim 2 further comprising:

(a) a torque arm attached to the strut; and (b) a scraper blade attached to the torque arm whereby the scraper blade is urged against the inner surface of the disc to clean the disc during operation of the coulter.

11. The coulter assembly of claim 3 further comprising:

(a) a torque arm attached to the strut; and (b) a scraper blade attached to the torque arm whereby the scraper blade is urged against the inner side of the disc to clean the disc during operation of the coulter.

12. The coulter assembly of claim 3 further comprising:

(a) a housing attached to the strut;

(b) a shaft mounted inside the housing having an upper end and a lower end, whereby the shaft is free to rotate relative to the housing;

(c) resilient means connected between the shaft and the strut at a first end of the shaft normally urging the shaft in one direction of rotation relative to the housing whereby rotation of the shaft relative to the housing is resiliently restrained in an opposite direction; and (d) a scraper blade attached to the shaft at the lower end of the shaft whereby the scraper blade is normally urged against the inner side of the disc.

13. The coulter assembly of claim 12 wherein the resilient means is a torsion spring.

14. The coulter assembly of claim 13 further comprising a tube holder for fertilizer or seeds indirectly attached to the housing.

15. The coulter of claim 14 further comprising:

a bracket attached to the housing; and said tube holder for fertilizer or seeds attached to the bracket, the bracket being attached to the housing.

16. A coulter assembly comprising:

(a) a substantially vertically oriented mounting bracket having a lower end and an upper end;

(b) a strut, having an upper end and a lower end;

(c) a coupling attached to the upper end of the strut and pivotally connected to the lower end of the mounting bracket;

(d) a disc, rotatably attached to the lower end of the strut whereby an inner side of the disc faces the strut;

(e) a tine, attached to the strut and extending across an outer side of the disc, wherein the tine is an elongate member with a first end attached to the coupling, said elongate member being bent in such a configuration as to extend across the outer surface of the disc such that only a second end of the elongate member contacts the disc; the second end remaining inside the perimeter of the disc; said tine being adapted in operation to collect trash and thereby form an organic wear pad to avoid excess wear on the disc and tine and clean said disc; and (f) a spring connected between the mounting bracket and the coupling whereby the coupling will rotate upon elevation of the tine to avoid obstacles when in operation.

* * * * *